United States Patent [19]
Holtermann et al.

[11] Patent Number: 5,809,776
[45] Date of Patent: Sep. 22, 1998

[54] CATALYTIC CONVERTER WITH RADIAL OUTFLOW AND BY-PASS VALVE

[75] Inventors: Theodore J. Holtermann, Brookfield; Francis A. McGinnity, Hartland, both of Wis.

[73] Assignee: Outboard Marine Corporation, Waukegan, Ill.

[21] Appl. No.: 681,886

[22] Filed: Jul. 29, 1996

[51] Int. Cl.[6] .................................................... F01N 3/28
[52] U.S. Cl. .......................... 60/288; 60/299; 422/181
[58] Field of Search .............................. 60/277, 288, 297, 60/298, 299, 302, 306, 311; 29/890; 422/180, 181

[56] References Cited

U.S. PATENT DOCUMENTS

| | | | |
|---|---|---|---|
| 2,185,584 | 1/1940 | Boyce | 55/517 |
| 3,094,394 | 6/1963 | Innes et al. | 422/181 |
| 3,109,715 | 11/1963 | Johnson et al. | 60/299 |
| 3,154,388 | 10/1964 | Purse | 422/181 |
| 3,222,140 | 12/1965 | Scivally et al. | 60/288 |
| 3,380,810 | 4/1968 | Hamblin | 422/181 |
| 3,920,404 | 11/1975 | Gandhi et al. | 422/181 |
| 4,457,895 | 7/1984 | Prigent | 422/179 |
| 4,848,082 | 7/1989 | Takahashi et al. | 60/277 |
| 4,969,328 | 11/1990 | Kammel | 60/275 |
| 4,987,738 | 1/1991 | Lopez-Crevillen et al. | 60/286 |
| 5,293,742 | 3/1994 | Gillingham et al. | 60/288 |
| 5,345,762 | 9/1994 | Lutze | 60/288 |
| 5,512,250 | 4/1996 | Betta et al. | 422/181 |
| 5,593,645 | 1/1997 | Steenackers et al. | 60/299 |
| 5,635,141 | 6/1997 | Fischer | 60/299 |

OTHER PUBLICATIONS

Ward's Engine and Vehicle Technology Update, Jun. 15, 1994.

Primary Examiner—Willis R. Wolfe
Attorney, Agent, or Firm—Jones, Day, Reabis & Pogue

[57] ABSTRACT

Disclosed herein is an outboard motor including a propulsion unit including an internal combustion engine having an exhaust port and an exhaust gas discharge system including a catalytic converter comprising a housing having an outer wall defining an axis, an inlet end with an inlet, and an outlet end with an outlet, a catalytic element located in the housing concentrically with the axis and having an outer surface defining, with the housing outer wall, an outlet volume which increases in size in the direction toward the housing outlet end, an inner surface spaced from the outer surface, defining therein an inlet volume, and defining, adjacent the housing outlet end, a by-pass opening communicating between the inlet volume and the housing outlet, and flow passages extending radially outwardly from the inner surface to the outer surface, communicating, at the inner surface, with the inlet volume, and communicating, at the outer surface, with the outlet volume, and a deflector moveable between a blocking position closing the by-pass opening and a by-pass position spaced from the by-pass opening and allowing flow therethrough from the inlet volume to the housing outlet.

20 Claims, 3 Drawing Sheets

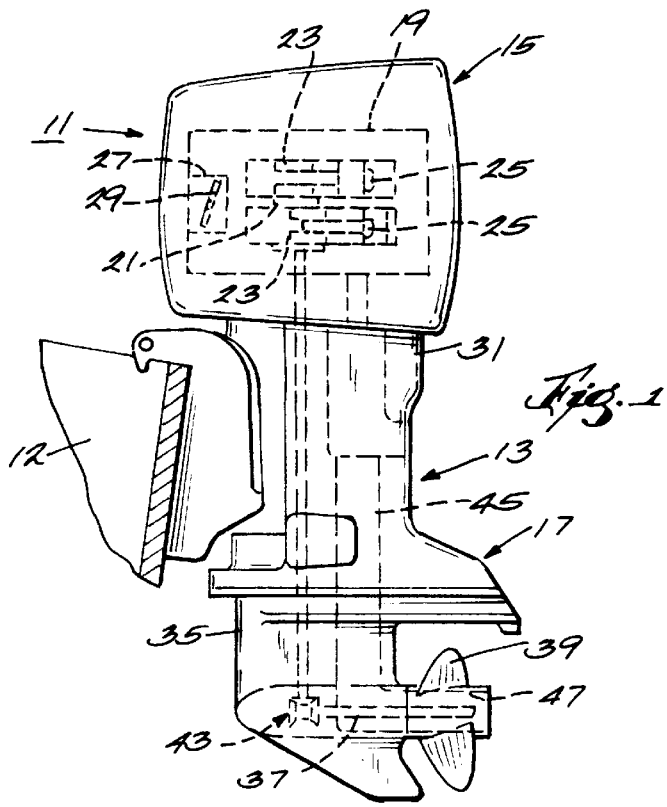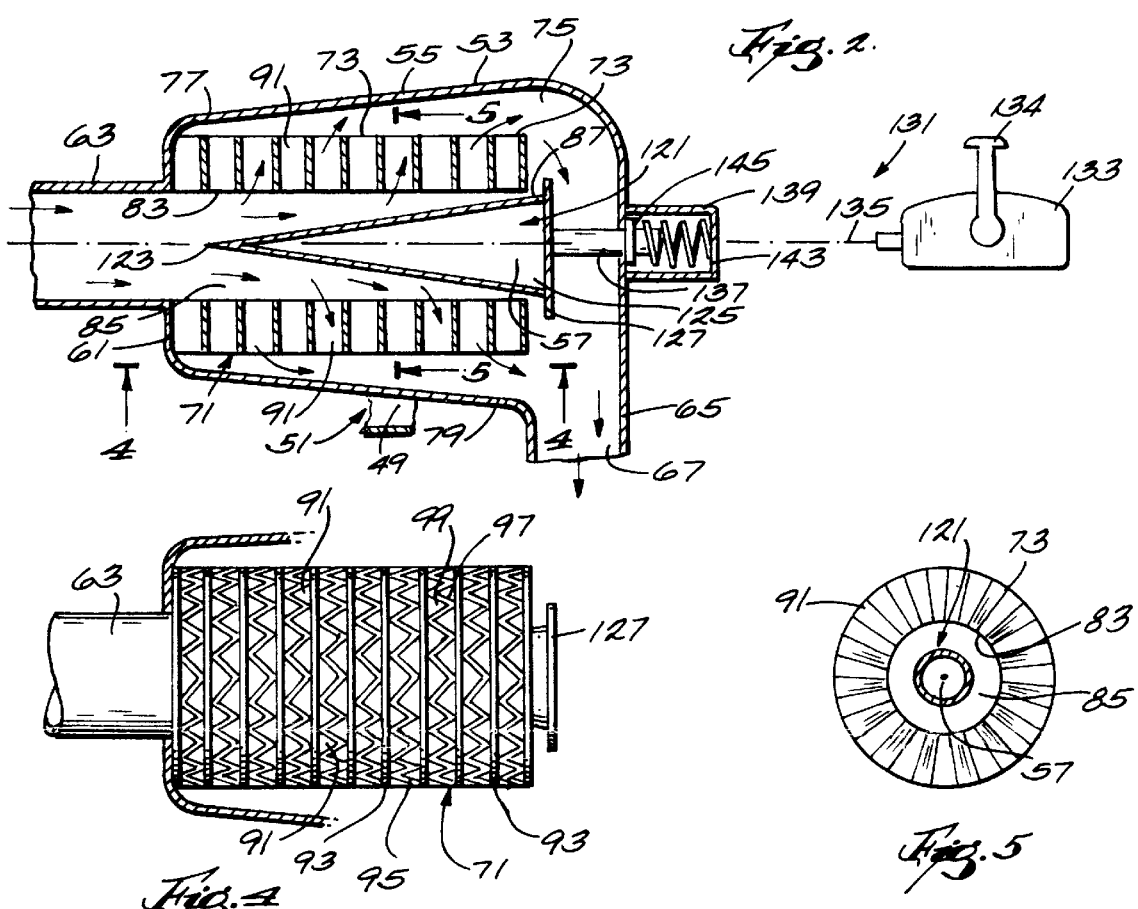

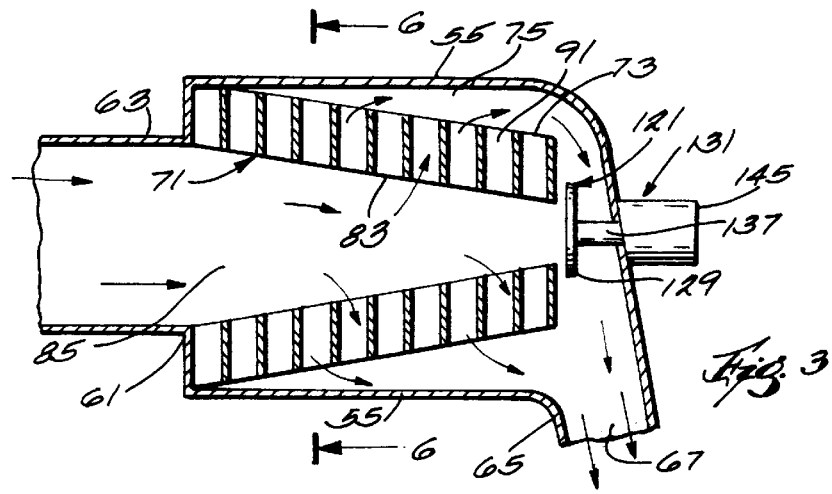
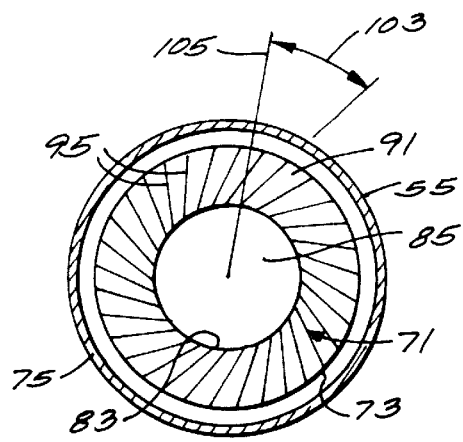
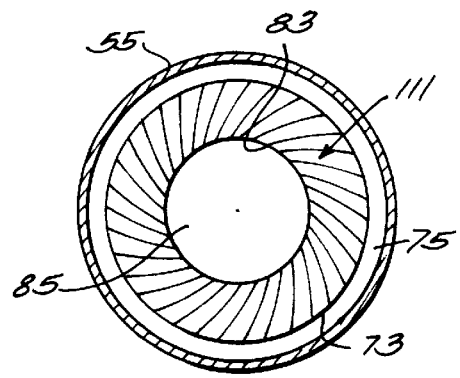
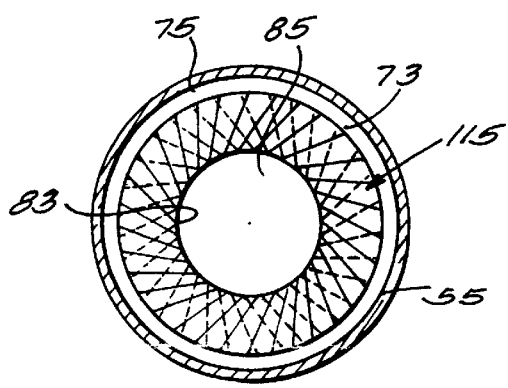

CATALYTIC CONVERTER WITH RADIAL OUTFLOW AND BY-PASS VALVE

BACKGROUND OF THE INVENTION

The invention relates generally to catalytic converters, and, more particularly, to catalytic converters with radially outward exhaust gas flow through a catalytic element.

The invention also relates to marine propulsion devices, such as an outboard motor, which propulsion devices include catalytic converters.

Attention is directed to the following U.S. Patents:

| | |
|---|---|
| 2,185,584 | Issued January 2, 1940 |
| 3,094,394 | Issued June 18, 1963 |
| 3,154,388 | Issued October 27, 1964 |
| 3,222,140 | Issued December 7, 1965 |
| 3,380,810 | Issued April 30, 1968 |
| 3,920,404 | Issued November 18, 1975 |
| 4,457,985 | Issued July 3, 1984 |
| 4,969,328 | Issued November 13, 1990 |
| 4,987,738 | Issued January 29, 1991 |
| 5,293,742 | Issued March 15, 1994 |

Attention is also directed to the Jun. 15, 1994 issue of "Wards Engine and Vehicle Technology Update".

SUMMARY OF THE INVENTION

The invention provides a catalytic converter comprising a housing having an outer wall defining an axis, an inlet end with an inlet, and an outlet end with an outlet, a catalytic element located in the housing concentrically with the axis and having an outer surface defining, with the outer wall of the housing, an outlet volume which increases in size in the direction toward the outlet end of the housing, an inner surface spaced from the outer surface, defining therein adjacent the housing inlet end, an inlet volume, and defining, adjacent the housing outlet end, a by-pass opening communicating between the inlet volume and the housing outlet, and flow passages extending radially outwardly from the inner surface to the outer surface, communicating, at the inner surface, with the inlet volume, and communicating, at the outer surface, with the outlet volume, a deflector moveable between a blocking position closing the by-pass opening and a by-pass position spaced from the by-pass opening and allowing flow therethrough from the inlet volume to the housing outlet, and means for variably displacing the deflector between the blocking position and the by-pass position to variably permit flow from the inlet volume to the outlet.

The invention also provides a catalytic converter comprising a housing having an inlet, and an outlet, a catalytic element located in said housing between said inlet and said outlet and including flow passages communicating between said housing inlet and said housing outlet, a by-pass communicating between said housing inlet and said housing outlet in by-passing relation to said flow passages, a deflector moveable between a blocking position closing said by-pass and a by-pass position spaced from said by-pass and allowing flow therethrough from said housing inlet to said housing outlet, and means for variably displacing said deflector between said blocking position and said by-pass position to variably permit flow from said housing inlet to said housing outlet.

The invention also provides a catalytic converter comprising a housing having an outer generally cylindrical wall defining an axis, an inlet end with an inlet, and an outlet end with an outlet, a catalytic element located in the housing concentrically with the axis and having an end adjacently spaced from the housing outlet, an outer generally conical surface having a large end adjacent the housing inlet end and a small end adjacent the housing outlet end, and defining, with the outer wall of the housing, an outlet volume which increases in size in the direction toward the housing outlet end, a generally conical inner surface spaced from the outer surface at a generally constant radial distance, defining therein an inlet volume increasing in size in the direction toward the housing inlet end, and defining, adjacent the housing outlet end, a by-pass opening communicating between the inlet volume and the housing outlet, and flow passages extending radially outwardly from the inner surface to the outer surface, communicating, at the inner surface, with the inlet volume, and communicating, at the outer surface, with the outlet volume, a deflector moveable between a blocking position closing the by-pass opening and a by-pass position spaced from the by-pass opening and allowing flow therethrough from the inlet volume to the housing outlet and comprising a generally flat and imperforate member engageable with the end of the catalytic element, and means for variably displacing the deflector between the blocking position and the by-pass position to variably permit flow from the inlet volume to the outlet.

The invention also provides a catalytic converter comprising a housing having an outer generally conical wall defining an axis, and including a smaller inlet end with an inlet, and a larger outlet end with an outlet, a catalytic element located in the housing concentrically with the axis and having an outer generally cylindrical surface defining, with the housing outer wall, an outlet volume which increases in size in the direction toward the housing outlet end, an inner generally cylindrical surface spaced from the outer surface at a generally constant radial distance, defining therein an inlet volume, and defining, adjacent the outlet end of the housing, a by-pass opening communicating between the inlet volume and the housing outlet, and flow passages extending radially outwardly from the inner surface to the outer surface, communicating, at the inner surface, with the inlet volume, and communicating, at the outer surface, with the outlet volume, a deflector moveable between a blocking position closing the by-pass opening and a by-pass position spaced from the by-pass opening and allowing flow therethrough from the inlet volume to the housing outlet, the deflector being imperforate and conical in shape and extending into the inlet volume and having a smaller end adjacent the inlet end of the housing and a larger end adjacent the outlet end of the housing, and means for variably displacing the deflector between the blocking position and the by-pass position to variably permit flow from the inlet volume to the outlet.

The invention also provides an outboard motor including a propulsion unit including an internal combustion engine having an exhaust port and an exhaust gas discharge system including a catalytic converter comprising a housing having an outer wall defining an axis, an inlet end with an inlet, and an outlet end with an outlet, a catalytic element located in the housing concentrically with the axis and having an outer surface defining, with the housing outer wall, an outlet volume which increases in size in the direction toward the housing outlet end, an inner surface spaced from the outer surface, defining therein an inlet volume, and defining, adjacent the housing outlet end, a by-pass opening communicating between the inlet volume and the housing outlet, and flow passages extending radially outwardly from the inner surface to the outer surface, communicating, at the inner surface, with the inlet volume, and communicating, at the outer surface, with the outlet volume, a deflector moveable between a blocking position closing the by-pass opening and a by-pass position spaced from the by-pass opening and allowing flow therethrough from the inlet volume to the housing outlet, and means for variably displacing the deflector between the blocking position and the by-pass position to variably permit flow from the inlet volume to the outlet, and a cooling jacket extending around the housing.

The invention also provides a method of fabricating a catalytic element comprising the steps of forming a plurality of discs formed with hills and valleys and having opposed catalytically active surfaces, stacking the discs in aligned adjacent relation to each other and with the hills in engagement so as to define contact areas of minimum dimension between adjacent discs and flow passages between the adjacent discs, joining together the contact areas of the adjacent discs so as to maximize the catalytically active surfaces of the adjacent discs.

The invention also provides a method of fabricating a catalytic element comprising the steps of forming a first plurality of discs having opposed generally planar catalytically active surfaces, forming a second plurality of discs formed with hills and valleys and having opposed catalytically active surfaces, stacking the discs in aligned adjacent relation to each other with the first discs interleaved between the second discs and with the hills of the second discs in engagement with the generally planar surfaces of the first discs so as to define contact areas of minimum dimension between adjacent discs and flow passages between the adjacent discs, joining together the contact areas of the adjacent discs so as to maximize the catalytically active surfaces of the adjacent discs.

Other features and advantages of the invention will become apparent to those skilled in the art upon review of the following detailed description, claims and drawings.

DESCRIPTION OF THE DRAWINGS

FIG. 1 is a side elevational view of an outboard motor incorporating various of the features of the invention.

FIG. 2 is an enlarged, schematic view of a catalytic converter included in the outboard motor shown in FIG. 1.

FIG. 3 is an enlarged, schematic view of another embodiment of a catalytic converter which can be included in the outboard motor shown in FIG. 1.

FIG. 4 is a sectional view taken generally along line 4—4 in FIG. 2.

FIG. 5 is a sectional view taken generally along line 5—5 in FIG. 2.

FIG. 6 is a sectional view taken generally along line 6—6 in FIG. 3.

FIG. 7 is a sectional view, similar to FIG. 6, of another embodiment of a catalytic element incorporating various of the features of the invention.

FIG. 8 is a sectional view, similar to FIG. 6, of another embodiment of a catalytic converter incorporating various of the features of the invention.

Figure 9:
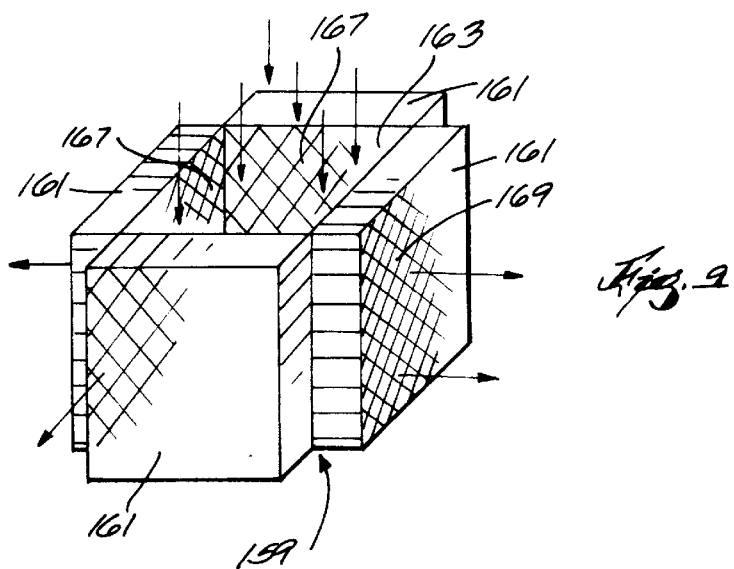
FIG. 9 is a perspective view of another embodiment of a catalytic converter embodying various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIG. 1 of the drawings is an outboard motor 11 which is shown mounted on a boat 12 and which comprises a propulsion unit 13 including a power head 15 and a lower unit 17. Included in the power head 15 is an internal combustion engine 19 having a crankshaft 21 and one or more cylinders 23 each having an exhaust gas port 25. The power head 15 also includes a carburetor 27 which is mounted on the engine and which has a rotatable mounted throttle control lever 29.

The lower unit 17 includes as drive shaft housing 31 which, at the upper end thereof, supports the engine 19 and which, at the lower end thereof, is fixedly connected to a gear case 35 which supports a propeller shaft 37 which, in turn, carries a propeller 39. Located in the drive shaft housing 31 is a drive shaft 41 which, at the upper end thereof, is connected to the crankshaft 21, and which, at the lower end thereof, is connected to a reversing transmission 43. The lower unit 17 also includes an exhaust gas passage 45 which, at the upper end thereof, communicates with the engine exhaust ports 25 and which, at the lower end thereof, communicates with an exhaust gas discharge port 47 which, preferably, is formed in the propeller 39. As thus far disclosed, the construction is conventional.

Shown in FIG. 2 of the drawings is a catalytic converter 51 which is included in the exhaust gas passage 45, which, preferably, is enclosed by a water or cooling jacket 49 (shown fragmentarily in FIG. 2), and which includes an outer housing 53 defined by an outer wall 55 which can be either generally cylindrical or generally conical and which defines an axis 57. In the embodiment shown in FIG. 2, the outer wall 55 is generally conical. In the embodiment shown in FIG. 3, the outer wall 55 is generally cylindrical. In addition, the housing 53 includes an inlet end 61 with an inlet 63, and an outlet end 65 with an outlet 67. Preferably, the outlet 67 is located above the level of the water in which the boat 12 is floating when the engine 19 is operating at idle or low speed.

The catalytic converter 51 also includes a catalytic element 71 located in the housing 53 concentrically with the axis 57 and having an outer wall or surface 73 and defining, with the outer wall 55 of the housing 53, an outlet volume 75 which increases in size in the direction toward the housing outlet end 65. In the embodiment shown in FIG. 2, the outer surface 73 of the catalytic converter 71 is generally conical and includes a smaller end 77 adjacent the housing inlet end 61 and a larger end 79 adjacent said housing outlet end 65. In the embodiment shown in FIG. 3, the outer surface 73 of the catalytic converter 71 is generally cylindrical.

In addition, the catalytic element 71 also includes an inner surface 83 spaced from the outer surface 73 at a generally constant radial distance, defining therein, adjacent the housing inlet end 61, an inlet volume 85, and defining, adjacent the housing outlet end 65, a by-pass opening 87 communicating between the inlet volume 85 and the housing outlet 67.

In the embodiment shown in FIG. 2, the inner surface 83 is generally cylindrical and is spaced from said outer surface 73 at a generally constant radial distance.

In the embodiment shown in FIG. 3, the inner surface 83 is generally conical, is spaced from the outer surface 73 at a generally constant radial distance, and the inlet volume 85 increases in size in the direction toward the housing inlet end 61.

Still further in addition, the catalytic element 71 defines a plurality of flow passages 91 extending radially outwardly from the inner surface 83 to the outer surface 73, and communicating, at the inner surface, with the inlet volume 85, and communicating, at the outer surface 73, with the outlet volume 75.

In the embodiment shown in FIGS. 2 and 4, the flow passages 91 are provided by a series of centrally apertured, circular, flat members 93 and a series of circular, configured members 95 which are stacked one upon the other. One or both of the members 93 and 95 is preferably provided with catalytic material on the outer surfaces thereof. Every other of the members 93 and 95 is a configured member 95 formed within an endlessly undulating configuration defining, on one side of the member 95, a series of radially extending concavities 97, and, on the other side of the member 95, a like series of radially extending concavities 99, which concavities 97 and 99 constitute the flow passages 91 and expand in the radially outward direction. The concavities 97 and 99 can be formed either in a sineous like curve or by flat angled surfaces, as shown in FIG. 4. The flat members 93 are located between the configured members 95. The members 93 and 95 can be formed of thin material having thereon a catalytic surface.

In the embodiment shown in FIG. 3, the flow passages 91 are formed generally in like manner as in FIG. 3, except that the outer diameters and inner diameters of the interleaved members 93 and 95 decrease from the housing inlet end 61 to the housing outlet end 65. In both embodiments, the radial length of the flow passages 91 is constant between the inlet ends and the outlet ends.

As shown in FIG. 6, the flow passages 91 can extend at an angle 103 to a radial line 105 and are defined by rectilinearly extending configured members 95, thereby increasing the length of the flow passages 91 and increasing the cross-sectional area at the outer ends thereof.

Shown in FIG. 7 is still another embodiment of a catalytic element 111 wherein the flow passages 91 extend arcuately or curvilinearly from the inner ends to the outer ends, thereby also increasing the length of the flow passages 91 and increasing the cross-sectional area at the outer ends thereof.

Shown in FIG. 8 is still another embodiment of a catalytic element 115 which is formed with adjacent configured members 95 configured as shown in either of FIGS. 6 and 7 and when these members 95 are stacked so that the undulations in every other member extend oppositely and cross each other, and without the flat members 93.

The construction shown in FIG. 8 is particularly desirable in that openings are provided between the flow passages, which openings allow mixing between the flow passages and produce turbulence which can enhance the reaction efficiency. Another advantage is that the contact area between layers is substantially reduced, and thus less surface area lost because of the brazing together of the members 93 and 95.

The embodiments shown in FIGS. 6, 7, and 8 advantageously provide somewhat longer and less uniform flow paths through the flow passages as compared to the straight radial passages shown in FIG. 5.

The catalytic converter 51 also includes a deflector or valve member or inner cone 121 moveable between a blocking position closing the by-pass opening 87 and a by-pass position spaced from the by-pass opening 87 and allowing exhaust gas flow therethrough from the inlet volume 85 to the housing outlet 67. In the outboard motor 11, this is particularly desirable when the outboard motor 11 is operating at full throttle.

In the embodiment shown in FIG. 2, the valve member or deflector 121 is imperforate and conical in shape and extends into the inlet volume 85. The valve member or deflector 121 has a smaller end 123 adjacent the housing inlet end 61 and a larger end 125 adjacent the housing outlet end 65. At the larger end 125, the deflector or valve member 121 also includes a flat disc member 127 sealingly engageable with the adjacent end of the catalytic element 71.

In the embodiment shown in FIG. 3, the valve member or deflector 121 comprises a generally flat and imperforate member 129 sealingly engageable with the adjacent end of the catalytic element 71.

Still further in addition, the catalytic converter 51 includes means for variably displacing the deflector or valve member 121 between the blocking position and the by-pass position to variably permit flow from the inlet volume 85 to the outlet 67. Any suitable actuator or mechanism 131, such as a pneumatic ram or a hydraulic ram, or other mechanical or electrical device, can be employed. In the embodiment shown in FIG. 2, the actuating mechanism 131 includes a remotely located single lever control 133 which includes a rotatable mounted throttle control lever 134 and which is connected by a diagrammatically illustrated push pull cable 135 to a shaft 137 which is fixed to the valve member 121 and which extends into a housing 139 fixed to the housing 53. In addition, the valve member 121 is biased to the blocking position closing the by-pass opening 87 by a spring 141 which is located in the housing 139 and which bears, at one end, against a wall 143 of the housing 139 and which, at the other end, bears against a collar 143 fixed on the shaft 137. In the embodiment shown in FIG. 3, the actuating mechanism 131 comprises a hydraulic cylinder 145 connected to the shaft 137 which extends from the flat and imperforate plate or disc 129.

In another embodiment, the deflector or cone 121 could be opened (against the action of a spring) by increasing exhaust pressure in generally the same manner as a pressure relief valve. This would make the by-pass self-regulating as the throttle was opened and exhaust flow increased.

Shown in FIG. 9 is still another embodiment of a catalytic element 159 formed from four generally rectangular blocks or bricks 161 which define therebetween a rectangular passage or an inlet area 163 which include rectangular side faces 167 located in spaced parallel relation to each other. In addition, each of the bricks 161 includes flow passages 169 extending generally perpendicularly to the side faces 167.

Figure 10:
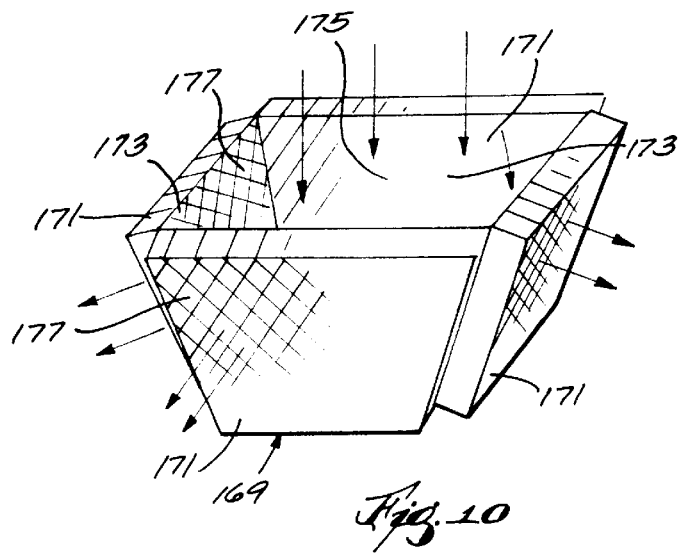
FIG. 10 is a perspective view of another embodiment of a catalytic element embodying various of the features of the invention.

Shown in FIG. 10 is still another embodiment of a catalytic element 169 formed from four blocks or bricks 171 which define a flow passage or inlet volume 175 in the shape of a trapezoidal rhomboid and which respectively include side faces 173 of generally trapezoidal shape. As with respect to the embodiment shown in FIG. 9, the blocks 171 provide flow passages 177 extending generally perpendicularly to the trapezoidal side faces 173. The four blocks 171 define, at one end thereof, a rectangular inlet area 179.

Figure 11:
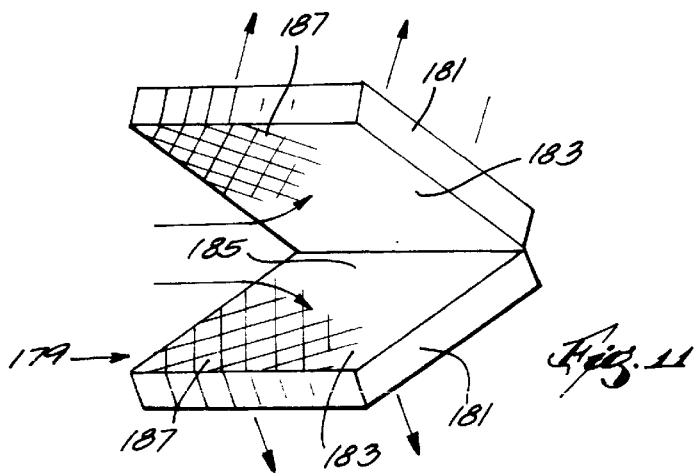
FIG. 11 is a perspective view of another embodiment of a catalytic element embodying various of the features of the invention.

Shown in FIG. 11 is still another embodiment of a catalytic element 179 which is in the form of two rectangular blocks or bricks 181 which include spaced parallel side faces 183 and which are arranged at an angle to each other so as to define a triangular inlet area or volume 185. In addition, the bricks include flow passages 187 which extend generally perpendicularly to the side faces 183.

An important principal advantage of the disclosed constructions is the large frontal area (cross-section, normal to the flow) and outward radial flow of the catalytic element 71 in comparison to the overall size of the converter. This compactness is especially desirable in an outboard motor.

During outward radial exhaust gas flow through the catalytic element, the exhaust gas is inevitably heated during movement through the catalyst, and the volume of gas that must be handled at the outlet is greater than at the inlet. Because the wall thickness of the radially outwardly extending flow passages in the catalytic element 71 is constant, the flow passage cross-sectional area increases in the radially outward direction. This increase in flow area accommodates the increase in gas volume and, by reducing the average gas velocity, advantageously increases the residence time and enhances the reaction.

In a marine applications, it is desirable that the catalytic converter be water cooled. If a water jacket were put around a converter with radial inflow, the exhaust gas would be cooled before entering the catalytic element. Since the catalyst temperature must be elevated to trigger a reaction, cooling of the exhaust gas before entering the catalytic element tends to delay the beginning of activity and, in an extreme case, could prevent the occurrence of the desired reaction. However, in the disclosed construction, the exhaust gas flow is radially outward, thereby avoiding cooling of the gasses before entering the catalytic element.

Furthermore, in the disclosed construction, the exhaust gases which leave the catalytic element and which are the hottest are the gasses which are cooled. Such cooling is beneficial to downstream components exposed to the hot exhaust gas, such as the propshaft bearing or the propeller hub.

The effect of the convergence zone or inlet volumes 85 indicated in FIGS. 2 and 3 is to equalize the exhaust flow throughout the length of the catalytic element 71. This is very desirable, and the effect is obtained in the radial outflow configuration with the conical, or parabolic inner cone or deflector member 121 of FIG. 2 and the configuration of the catalytic element 71 in FIG. 3. Employment of the tapered, divergent outlet volume 75 assists in equalizing the velocities of the exhaust gasses leaving the catalytic element 71, and provides some reduction in the overall volume of the catalytic converter 51.

In an outboard motor, the mass flow of engine exhaust emissions, and the thermal loading on the catalyst, are typically greatest at maximum power. In the disclosed construction, opening of the by-pass opening 87 serves to avoid overheating the catalytic element 71 by permitting at least some of the exhaust gases to by-pass the catalytic element 71 during wide open throttle operation.

In outboard motors employing two-stroke internal combustion engines, sudden changes in cross-sectional area of the exhaust flow path can adversely impact the dynamic exhaust tuning of the engine. Accordingly, and contrary to most typical catalytic installations, wherein the frontal area of the catalytic element is larger (usually several times larger) than the normal flow area of the rest of the exhaust system, and wherein the flow passage expands abruptly at the entry to the catalytic element, and contracts after the catalytic element. In the disclosed construction, the cross-sectional flow area of the exhaust passages is nearly uniform, thereby minimizing any effect on the tuned exhaust.

One method of fabricating a catalytic element in accordance with the invention comprises the steps of forming a plurality of discs formed with undulations or hills and valleys and having opposed catalytically active surfaces, stacking the discs in aligned adjacent relation to each other and with the hills in engagement so as to define contact areas of minimum dimension between adjacent discs and flow passages between the adjacent discs, joining together the contact areas of the adjacent discs so as to maximize the catalytically active surfaces of the adjacent discs.

In one embodiment, the step of forming the second plurality of discs includes forming the discs with a circular periphery having a central axis and with the hills extending radially from the axis and with the valleys extending between the hills.

In another embodiment, the step of forming the second plurality of discs includes forming the discs with a circular periphery having a central axis and with the hills extending from the axis at an angle to a radial line.

In still another embodiment, the hills extend rectilinearly and the hills in adjacent discs extend in transverse relation to each other.

In a further embodiment, the hills extend curvilinearly and the hills in adjacent discs extend in transverse relation to each other. Another method of fabricating a catalytic element in accordance with the invention comprises the steps of forming a first plurality of discs having opposed generally planar catalytically active surfaces, forming a second plurality of discs formed with hills and valleys and having opposed catalytically active surfaces, stacking the discs in aligned adjacent relation to each other with the first discs interleaved between the second discs and with the hills of the second discs in engagement with the generally planar surfaces of the first discs so as to define contact areas of minimum dimension between adjacent discs and flow passages between the adjacent discs, joining together the contact areas of the adjacent discs so as to maximize the catalytically active surfaces of the adjacent discs.

In one embodiment, the step of forming the second plurality of discs includes forming the discs with a circular periphery having a central axis and with the hills extending radially from the axis.

In still another embodiment, as shown in FIG. 6, the step of forming the second plurality of discs includes forming the discs with a circular periphery having a central axis and with the hills extending from the axis at an angle to a radial line.

In the embodiment, as shown in FIG. 6, the hills extend rectilinearly.

In the embodiment shown in FIG. 7, the hills extend curvilinearly.

In still another embodiment, as shown in FIG. 8, the hills of a pair of the discs of the second plurality located in adjacent relation to the opposed surfaces of a disc of the first plurality extend in transverse relation to each other.

The term "joining" has been used in connection with the methods of the invention, and such "joining" can include any acceptable technique, such as, for instance, brazing.

Various of the features of the invention are set forth in the following claims.

We claim:

1. A catalytic converter comprising a housing having an outer wall defining an axis, an inlet end with an inlet, and an outlet end with an outlet, a catalytic element located in said housing concentrically with said axis and having an outer surface defining, with said outer wall of said housing, an outlet volume which increases in size in the direction toward said outlet end of said housing, an inner surface spaced from said outer surface, defining therein adjacent said housing inlet end, an inlet volume, and defining, adjacent said housing outlet end, a by-pass opening communicating between said inlet volume and said housing outlet, and flow passages extending radially outwardly from said inner surface to said outer surface, communicating, at said inner surface, with said inlet volume, and communicating, at said outer surface, with said outlet volume, a deflector moveable between a blocking position closing said by-pass opening and a by-pass position spaced from said by-pass opening and allowing flow therethrough from said inlet volume to said housing outlet, said deflector being imperforate and conical in shape and extending into said inlet volume and having a smaller end adjacent said inlet end of said housing and a larger end adjacent said outlet end of said housing, and means for variably displacing said deflector between said blocking position and said by-pass position to variably permit flow from said inlet volume to said outlet.

2. A catalytic converter in accordance with claim 1 wherein said outer wall is generally cylindrical.

3. A catalytic converter in accordance with claim 1 wherein said outer wall is generally conical and includes a smaller end adjacent said housing inlet and a larger end adjacent said housing outlet.

4. A catalytic converter in accordance with claim 1 wherein said outer surface is generally cylindrical and defines, with said housing outer wall, an outlet volume which increases in size in the direction toward said housing outlet end.

5. A catalytic converter in accordance with claim 1 wherein said inner surface is generally cylindrical and is spaced from said outer surface at a generally constant radial distance.

6. A catalytic converter in accordance with claim 1 wherein said radially outwardly extending flow passages extend generally rectilinearly.

7. A catalytic converter in accordance with claim 1 wherein said radially outwardly extending flow passages extend generally curvilinearly.

8. A catalytic converter comprising a housing having an inlet, and an outlet, a catalytic element located in said housing between said inlet and said outlet and including flow passages communicating between said housing inlet and said housing outlet, a by-pass communicating between said housing inlet and said housing outlet in by-passing relation to said flow passages, a deflector moveable between a blocking position closing said by-pass and a by-pass position spaced from said by-pass and allowing flow therethrough from said housing inlet to said housing outlet, said deflector being imperforate and conical in shape and extending into said catalytic element and having a smaller end adjacent said housing inlet and a larger end adjacent said housing outlet, and means for variably displacing said deflector between said blocking position and said by-pass position to variably permit flow from said housing inlet to said housing outlet.

9. A catalytic converter in accordance with claim 8 wherein said deflector is engageable with said catalytic element to close said by-pass.

10. A catalytic converter comprising a housing having an outer generally conical wall defining an axis, and including a smaller inlet end with an inlet, and a larger outlet end with an outlet, a catalytic element located in said housing concentrically with said axis and having an outer generally cylindrical surface defining, with said housing outer wall, an outlet volume which increases in size in the direction toward said housing outlet end, an inner generally cylindrical surface spaced from said outer surface at a generally constant radial distance, defining therein an inlet volume, and defining, adjacent said outlet end of said housing, a by-pass opening communicating between said inlet volume and said housing outlet, and flow passages extending radially outwardly from said inner surface to said outer surface, communicating, at said inner surface, with said inlet volume, and communicating, at said outer surface, with said outlet volume, a deflector moveable between a blocking position closing said by-pass opening and a by-pass position spaced from said by-pass opening and allowing flow therethrough from said inlet volume to said housing outlet, said deflector being imperforate and conical in shape and extending into said inlet volume and having a smaller end adjacent said inlet end of said housing and a larger end adjacent said outlet end of said housing, and means for variably displacing said deflector between said blocking position and said by-pass position to variably permit flow from said inlet volume to said outlet.

11. A catalytic converter in accordance with claim 10 wherein said flow passages are defined by a series of stacked configured members, and a series of flat members respectively located between each adjacent pair of said configured members.

12. A catalytic converter in accordance with claim 11 wherein said configured members include radially extending undulating configurations.

13. A catalytic converter in accordance with claim 12 wherein said configurations extend rectilinearly.

14. A catalytic converter in accordance with claim 12 wherein said configurations extend curvilinearly.

15. An outboard motor including a propulsion unit including an internal combustion engine having an exhaust port and an exhaust gas discharge system including a catalytic converter comprising a housing having an outer wall defining an axis, an inlet end with an inlet, and an outlet end with an outlet, a catalytic element located in said housing concentrically with said axis and having an outer surface defining, with said housing outer wall, an outlet volume which increases in size in the direction toward said housing outlet end, an inner surface spaced from said outer surface, defining therein an inlet volume, and defining, adjacent said housing outlet end, a by-pass opening communicating between said inlet volume and said housing outlet, and flow passages extending radially outwardly from said inner surface to said outer surface, communicating, at said inner surface, with said inlet volume, and communicating, at said outer surface, with said outlet volume, a deflector moveable between a blocking position closing said by-pass opening and a by-pass position spaced from said by-pass opening and allowing flow therethrough from said inlet volume to said housing outlet, and means for variably displacing said deflector between said blocking position and said by-pass position to variably permit flow from said inlet volume to said outlet, and a cooling jacket extending around said housing.

16. An outboard motor in accordance with claim 15 wherein said means for variably displacing said deflector comprises a movably mounted throttle control lever.

17. An outboard motor in accordance with claim 16 wherein said throttle control lever is located remotely from said outboard motor.

18. An outboard motor in accordance with claim 16 wherein said propulsion unit includes an engine, and wherein said throttle control lever is mounted on said engine.

19. An outboard motor in accordance with claim 16 wherein said propulsion unit includes an engine and a carburetor, and wherein said throttle control lever is mounted on said carburetor.

20. An outboard motor in accordance with claim 16 wherein said propulsion unit includes an engine, and wherein said outlet is located above the water level in which the outboard motor is operating when the outboard motor is operating at idle or low speed.

\* \* \* \* \*